(12) United States Patent
Gordon et al.

(10) Patent No.: US 6,289,323 B1
(45) Date of Patent: Sep. 11, 2001

(54) SYSTEM AND METHOD FOR COMPLETING MONETARY TRANSACTIONS BY PRESENTMENT OF POSTAGE VALUE TO A POSTAL AUTHORITY

(75) Inventors: Roy R. Gordon, Gaithersburg, MD (US); Wayne E. Wilkerson, Fredericksburg, VA (US); Dan Lord, Upper Marlboro, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 09/335,588

(22) Filed: Jun. 18, 1999

(51) Int. Cl.[7] ....................................................... G06F 17/60
(52) U.S. Cl. ............................................. 705/40; 705/401
(58) Field of Search .................................. 705/1, 40, 400, 705/401, 410

(56) References Cited

U.S. PATENT DOCUMENTS

| | | | |
|---|---|---|---|
| 4,941,170 | * | 7/1990 | Herbst .............................. 379/100.07 |
| 5,085,470 | * | 2/1992 | Peach et al. ............................ 283/58 |
| 5,321,604 | * | 6/1994 | Peach et al. ............................ 705/14 |
| 5,473,143 | * | 12/1995 | Vak et al. ............................. 235/380 |
| 5,590,196 | * | 12/1996 | Moreau .................................. 705/78 |
| 5,739,512 | * | 4/1998 | Tognazzini ............................ 235/380 |
| 5,805,702 | * | 9/1998 | Curry et al. ............................ 705/66 |
| 6,049,785 | * | 4/2000 | Gifford .................................. 705/39 |
| 6,098,053 | * | 8/2000 | Slater .................................... 705/44 |

FOREIGN PATENT DOCUMENTS

2341461 * 3/2000 (GB) .

OTHER PUBLICATIONS

Symoens: "Transact 3.0: Scalable solution"; InfoWorld, Sep. 8, 1997, v19, n36, pp. 63, 70.*
Business Wire: "Netcom Includes E–Commerce Software as Standard Feature in Web Hosting Line; Company Is Only ISP to Offer Open Market ShopSite Manager Lite.", Sep. 10, 1998, p. 9100012.*

* cited by examiner

Primary Examiner—Edward R. Cosimano
(74) Attorney, Agent, or Firm—Leydig, Voit & Mayer, Ltd.

(57) ABSTRACT

Methods and apparatuses are disclosed for conducting secure transactions via postal authority cryptographic transformations. In particular, value is issued in the form of a value message including a cryptographic transformation enabling a recipient to determine the authenticity of the value message. The recipient applies additional cryptographically transformed information to endorse the value message. The postal authority, receives the endorsed value message, cryptographically transforms the value message, and registers the transfer of value from the payor to the payee. Similarly, the cryptographic transformations can be used to protect the identity of a mail order customer while ensuring the authenticity of a purchase order and payment by a customer to a mail order merchant. In yet another application, the cryptographic transformations facilitate payment of bills via submission of "endorsed" postcards to the postal authority.

20 Claims, 9 Drawing Sheets

FIG. 1

| DATA ELEMENT | BAR-CODE | TEXT |
|---|---|---|
| 30 — Version | ✔ | |
| 32 — Algorithm ID | ✔ | |
| 34 — PSD Certificate Serial Number | ✔ | |
| 36 — Device ID | ✔ | |
| 38 — Ascending Register Value | ✔ | |
| 40 — Descending Register Value | ✔ | |
| 42 — Payment Value | ✔ | ✔ |
| 44 — Date/Time | ✔ | ✔ |
| 46 — Payee ID | ✔ | ✔ |
| 48 — Transaction Number | ✔ | ✔ |
| 50 — Payer Digital Signature | ✔ | |
| 52 — Algorithm ID | ✔ | |
| 54 — Payee Digital Signature | ✔ | |
| 56 — Date/Time | ✔ | ✔ |
| 58 — Transaction ID | ✔ | |
| 60 — Message/Memo | ✔ | |

SYSTEM AND METHOD FOR COMPLETING MONETARY TRANSACTIONS BY PRESENTMENT OF POSTAGE VALUE TO A POSTAL AUTHORITY

AREA OF THE INVENTION

The present invention generally relates to a method and system for paying for goods, services, etc. in a manner similar to checks, credit cards, and debit cards. More particularly the present invention relates to the use of cryptographically transformed user information to authenticate payments from a payer to a payee wherein the form of payment is a value message bearing, in addition to the typical information on a check, cryptographically transformed information including a digital signature for purposes of authenticating the value message. The value messages are authenticated and debited/credited to the payer/payee.

BACKGROUND OF THE INVENTION

Bank checks have been used for centuries to conduct "cashless" transactions, and involve the submission of a signed negotiable instrument in exchange for a product or service of value to the payer. Bank checks, while convenient, do have certain drawbacks since they can be easily forged and fraudulently endorsed by parties other than the intended recipients. As a result, a whole body of rules, regulations and restrictions—including delays in clearing bank checks for multiple days—has developed to deal with the inherent flaws in this system which relies upon an easily defeated form of authentication, a handwritten signature.

In this age of high technology, electronic funds transfers are becoming more and more prevalent and come in many forms. Credit cards are now more widely used. Automatic bill payment is the chosen means for many homeowners to pay the monthly mortgage and utility bills. Debit cards are similar to credit cards. However, the amount of a debit card transaction is taken immediately from a payer's corresponding bank account. A "smart" card is similar to a debit card except that value is stored within a smart card and therefore a user need not have a separate bank account from which funds are taken when a debit transaction occurs. A smart card is essentially a self-contained electronic wallet or purse.

Notwithstanding the advantages of electronic transactions, these methods continue to suffer from several drawbacks. One is authentication. Debit and credit cards continue to rely upon handwritten signatures.

The Internet has increased the public's awareness of the capabilities of the "information highway." This has led to users performing tasks such as buying goods and communication over the Internet. Some believe that the days of "old-fashioned" postal authority delivery of mail will fall by the wayside as email and facsimile transmissions provide instant delivery of communications at comparable cost. The electronic communications and transactions have certain drawbacks since a user must forfeit privacy to companies to carry out electronic communications and transactions. Furthermore, there is no easy way to establish trusted payment in electronic transactions over the Internet because private keys are difficult to secure and there is no trusted location to store such keys and value messages once they are issued.

SUMMARY OF THE INVENTION

The present invention remedies shortcomings of the prior known monetary transaction methods and apparatuses regarding authentication, privacy and convenience. In particular, in accordance with the present invention, a system and method are described for conducting monetary transactions using secure value messages.

In accordance with the present invention, a party wishing to make a purchase creates a value message using a postal authority postage evidencing/accounting device. The value message includes payer identification, payee identification and a value amount. The value message is then "signed" by the payer by generating and appending a digital signature to the value message. Upon presentation of the value message to a postal authority outlet, the value message is authenticated by applying a public key to the digital signature. Upon successful authentication of the digital signature, an account status is adjusted to reflect successful completion of negotiating the value message.

In accordance with another aspect to particular embodiments of the invention, parties using the postage accounting device can preserve privacy when making purchases from a merchant. A user submits a purchase order in the form of a value message to the merchant. The merchant ships the purchased goods with indicia including an identification number corresponding to the anonymous customer. The postal authority resolves the customer identification into an address.

In accordance with another aspect of particular embodiments of the invention, the postal authority can notify the customer when the mail is received by the postal authority or placed into a P.O. box, and in that notification can tell the customer who the sender is and what's inside the package.

In accordance with yet another aspect of particular embodiments of the invention, indicia are placed upon postcards to facilitate bill payment. A vendor places a postcard carrying bill payment indicia within a bill notification envelope. The customer, upon receipt of the bill notification envelope, initiates bill payment by placing the postcard into the postal stream. The postcard is extracted from the postal stream and the indicia decoded to affect bill payment in accordance with billing instructions encoded on the postcard.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
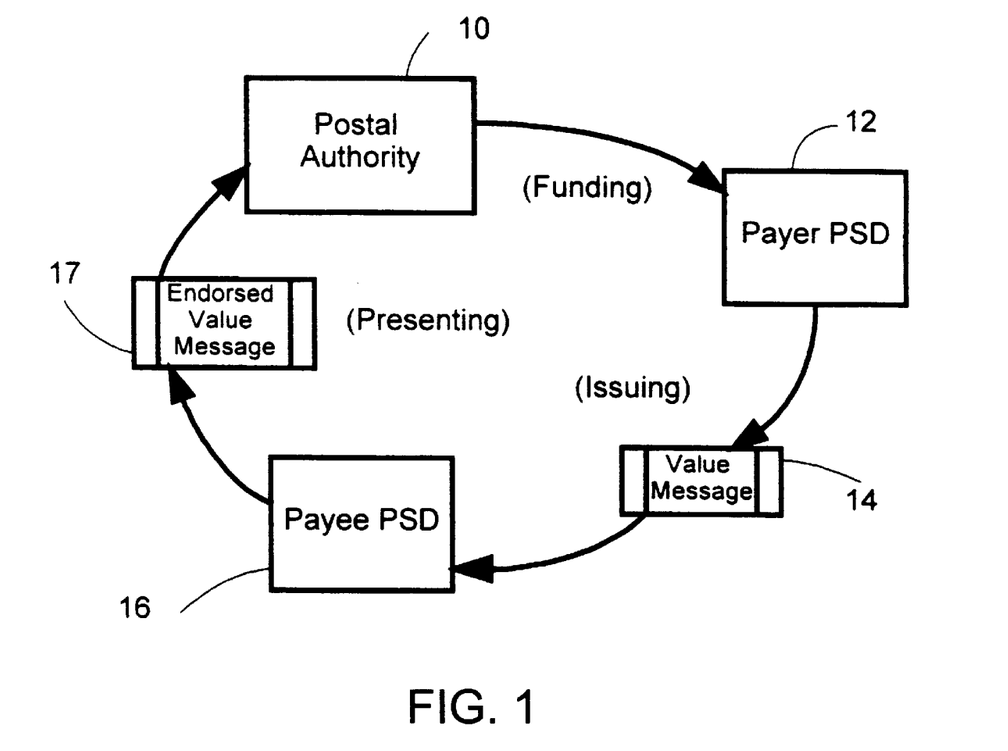
FIG. 1 schematically depicts a value message issuance and processing system incorporating the present invention.

Turning to FIG. 1, a schematic depiction is provided of a system incorporating the present invention. To simplify the description, the invention is described with reference to a single customer and merchant transaction. However, it will be appreciated by those skilled in the art that the present invention is used in a multiple customer/merchant environment. The postal authority 10, through its local outlets, performs initialization and finance/accounting operations relating to Payer Postal Security Device (PSD) 12 possessed by a person having an account with the postal authority. The Payer PSD 12 issues a value message 14 in exchange for goods and/or services. The merchant endorses the value message 14 by means of a Payer PSD 16 to render an endorsed value message 17. Thereafter, the merchant presents the endorsed payment PSD 17 to the postal authority 10. The postal authority 10, authenticates the value message and then credits the account of the Payee PSD 16 and registers the completed transaction in the account of the payer, the possessor of the Payer PSD 12.

The Payer PSD 12 is a secure register for evidencing/tracking value. In one implementation of the present invention, a possessor of the Payer PSD 12 deposits funds in advance with the postal authority. The possessor of the Payer PSD 12 then establishes a communication link enabling the postal authority or an intermediary (such as a postage evidencing device vendor) to request the postal authority to provide a value download message to the Payer PSD 12. The postal authority 10 issues a value download message to the Payer PSD 12 instructing the Payer PSD 12 to increase an internal account status register by an amount less than or equal to the amount transferred to the postal authority 10. The Payer PSD 12 will not issue value message value that exceeds the amount of available funds maintained within a local register of the Payer PSD 12. Such a system for limiting issuing value ensures that a user will not exceed the funds allocated to the Payer PSD 12. When used as a credit dispensing device, the Payer PSD 12 ensures that the user's disbursements of value message value do not exceed the credit left in the account, a value stored in secure internal registers within the Payer PSD 12. When used as a credit device, the internal registers ensure that the user's disbursements of value message value do not exceed the authorized credit limit. The Payer PSD 12 also includes the capability to log Payer PSD recharge operations and value message disbursements for purposes of auditing or verifying disbursements.

In yet another embodiment of the invention, the Payer PSD 12 is utilized as a secure signature device, but the user is not limited by an amount stored in a "rechargeable" value register. The user's transactions are merely registered at the postal authority and forwarded to the user's designated account which could be, for example, a credit card account or checking account.

While a number of functions performed by the Payer PSD 12 have been described, additional functions may be added as enhancements to the Payer PSD 12 without deviating from the disclosed invention. For example, a personal identification number (PIN) is used to "unlock" the payer PSD 12 and enable a user to issue a value message 14.

The value message 14 issued by the payer PSD 12 takes many forms. In one form, the value message 14 is output on paper or other visually perceptible media. In other embodiments, the value message may be issued in electronic format over a network or other electronic data transmission media to a Payee PSD 16. The Payee PSD 16 electronically endorses the value message by appending additional data fields and forwards an endorsed value message 17 to the postal authority 10 for the purpose of processing the endorsed value message 17.

Regardless of the form, the value message includes both text fields and encoded graphics such as one-dimensional or two-dimensional barcode graphics symbols. The value message is similar to, yet includes several variations from, the graphically encoded indicia of the known Information Based Indicia Program (IBIP) Performance Criteria for Information-Based Indicia and Security Architecture for IBI Postage Metering Systems (PCIBISAIBIPMS) published by the postal authority Aug. 19, 1998, the contents of which are incorporated by reference in their entirety. The text fields include a payer identification, a payee identification, a value assigned the value message by the payee, and a time/date that the value message was issued by the payee. The text fields will be described herein below in conjunction with a description of FIG. 2.

When the value message is placed on a paper media, the encoded graphics portion of the value message 14 includes barcode graphics corresponding to the above described text fields as well as additional information that is only provided in graphical barcode form. Digital barcode encoding the text fields facilitates processing value messages automatically without reliance upon character recognition technology that can be less reliable. Barcode graphics also provide a useful format for employing digital signature cryptographic transformations to establish the authenticity of value messages. The value message 14 is digitally signed by the Payer PSD 12 using a digital signature that is a function of the above described text fields. The payer digital signature, encoded using a private key and in accordance with well known public/private key cryptographic transformation schemes, is used to authenticate, with a very high level of reliability, the Payer PSD 12 from which the value message 14 was issued. Because the digital signature is based upon the data fields of the value message 14, it also ensures that none of the data fields have been altered.

In exchange for providing goods and/or services, the Payer PSD 12 issues the value message 14 to a merchant. After receiving the value message 14, the merchant endorses the value message 14 using a Payee PSD 16. The result of the endorsement process is the endorsed value message 17. During the endorsement process the merchant adds additional data (discussed further below) and then renders a second digital signature which is based upon data fields contained in the endorsed value message 17. Thus, in addition to the above fields found on the value message 14, the endorsed value message 17 includes data fields added by the Payee PSD 16. The added fields include a payee digital signature which is rendered in graphical barcode format on the endorsed value message 17. The payee digital signature, in combination with a Payee PSD identification, enables the postal authority 10 to authenticate the payee. Information fields of the value message 14 and endorsed value message 17 set forth above will be described in greater detail with reference to FIG. 2.

Continuing with the general description of FIG. 1, the merchant presents the endorsed value message 17, issued by the Payee PSD 16, to the postal authority 10. A barcode graphics scanner/decoder at the postal authority 10, or some other remote location communicatively linked to the postal authority 10, reads the encoded barcode graphics of the endorsed value message 17 and renders a set of binary data corresponding to the encoded digital information and digital signature. The postal authority 10 applies a public key corresponding to the decoded digital signature barcode graphics provided by the Payer PSD 12 and the Payee PSD 16 to authenticate a cryptographically created digital signatures. Thereafter the postal authority 10 compares the digital signatures to a second set of data obtained from the endorsed value message 17. If the public key cryptographically transformed digital signature matches the second set of data (e.g., a hashed version of information fields within the endorsed value message 17), then the postal authority 10 concludes that the endorsed value message 17 is authentic.

After the postal authority 10 determines that a value message 17 is authentic, further processing of the endorsed value message 17 proceeds in one of many possible ways based upon the transaction model with which the endorsed value message 17 is associated. If a value token model is used, then a value message downloaded to the Payer PSD 12 represents existing funds in an account. The customer has already deposited funds with the postal authority. When the postage value download request is fulfilled, the account associated with the Payer PSD 12 is debited and the postal authority's account is credited. When the money is spent, the payee negotiates the value message; the postal authority credits the account associated with the Payee PSD 16 and debits its own.

In accordance with an instruction Model, the PSD doesn't hold any funds. Instead, the PSD merely holds a private key used to sign value messages. Signed value messages are in effect an instruction, like a check to pay the account associated with the Payee PSD 16 from funds in the account of the Payer PSD 12. When the instruction is negotiated by the payee, the postal authority effectuates a transaction, debiting the account associated with the Payer PSD 12 (at a bank or at the postal authority) and crediting the account associated with the Payee PSD (at a bank or at the postal authority)

Finally, there is the issue of how the payee is to be satisfied. Above, the account for the Payee PSD 16 was credited. In a value token regime, the payee's demand for payment could be satisfied by a value download to the Payee PSD, by sending a paper check, or by effecting a transfer from one account (postal authority's or payer's) to the payee's account (whether at postal authority or at a bank). In an instruction-based regime, the payee really can't be satisfied by a value download because there is no such thing (the messages are just instructions not value). Therefore, in the payment instruction regime the demand is satisfied by a transfer effected outside the system (i.e., between accounts at postal authority or a bank).

Having described a number of possible payment resolution models for transferring funds in fulfillment of payment obligations, it is noted that these models are exemplar and should not be construed to limit the claimed invention unless expressly noted. Instead, it is envisioned that the present invention will be applicable to a number of transaction models including, for example, real value transmissions, credit instructions and debit instructions.

In accordance with a specific example of a debit instruction model for payment, the postal authority 10 processes authenticated endorsed value messages in a manner similar to the manner in which presented bank checks are processed. The postal authority 10 credits the account of the merchant/payee identified in the endorsed value message 17 and logs the presentation of the endorsed value message 17 within the account associated with the Payer PSD 12. Since value is not actually deducted from an account when the Payer PSD 12 is funded (the value has not been issued by the Payer PSD 12 nor has it been presented by a payee), the value of the endorsed value message 17 is subtracted from the payer's account. As noted previously above, the Payer PSD 12 may be used as a debit or credit device. In such instances, the postal authority 10 forwards the transaction to an appropriate financial institution.

Finally, with regard to FIG. 1, the Payer PSD 12 and Payee PSD 16 are represented as two physically separate devices. This representation of these devices is intended to highlight the particular functions and operations of interest with regard to issuing a value message and endorsing a value message. However, the Payer PSD 12 and Payee PSD 16 may be incorporated within a single device which performs either function.

Figure 2:
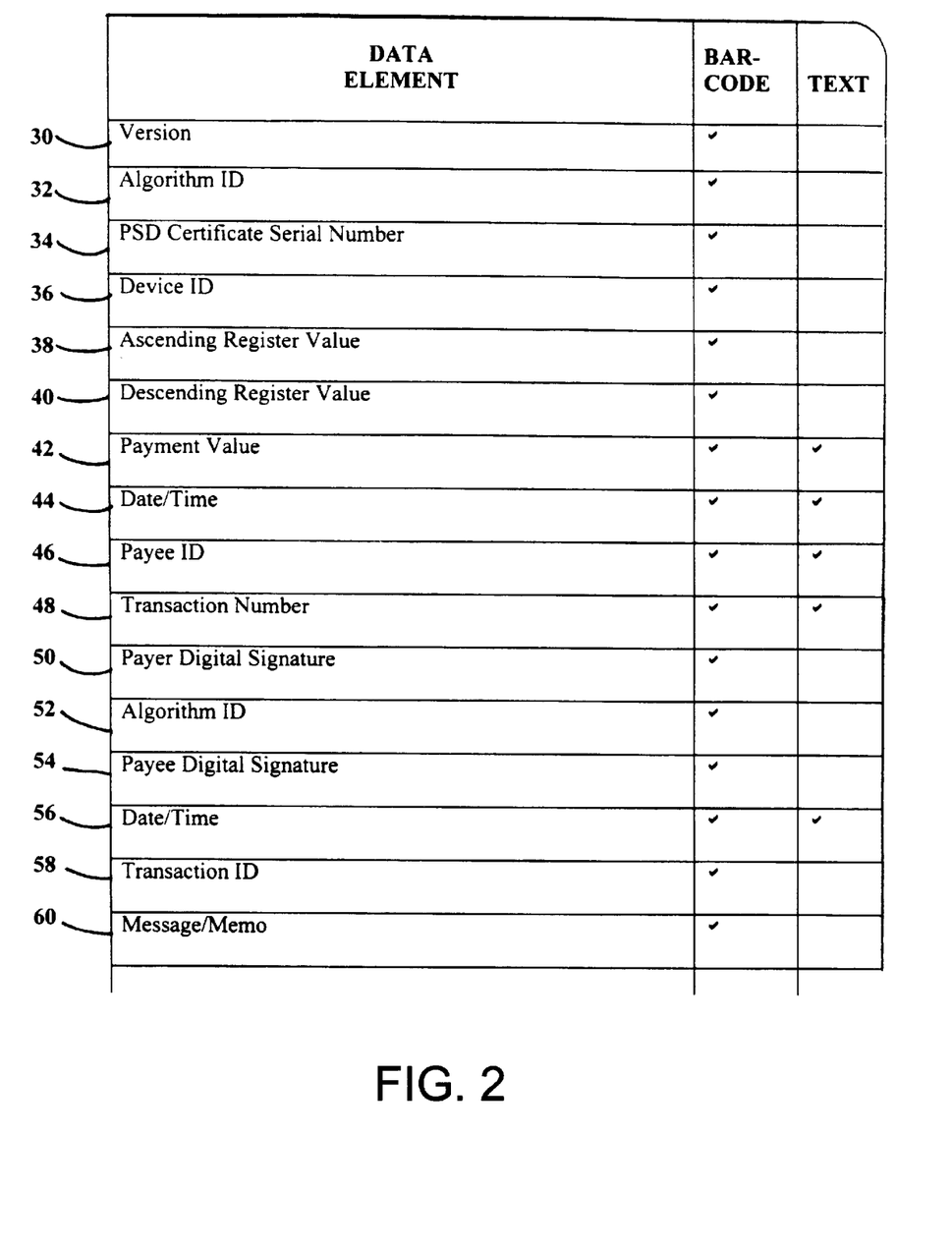
FIG. 2 is a diagram depicting the fields of a value message.

Turning to FIG. 2, the fields of a value message are summarized in chart format. A first column identifies a particular data element represented on the value message. A second column specifies whether the data element identified in column 1 is provided in the barcode graphics portion of the value message. A third column specifies whether the data element identified in column 1 is also represented in text form. The length of the data elements range from 1 byte to over one hundred bytes. The largest field, an RSA digital signature, is 128 bytes. It is noted, however, that the choices for the lengths of various data fields are design considerations and do not limit the claimed invention. It is further noted that while several data element are identified in FIG. 2, others may be added without deviating from the invention.

A first group of data elements enables the postal authority 10 to perform certain initial inquiries to determine how to interpret a received endorsed value message. A version 30, provided in barcode form only, identifies the version of the indicia printed on the value message to ensure that the barcode graphics are properly decoded/interpreted by the postal authority 10. Next, an algorithm ID 32, provided in barcode form only, identifies the type of cryptographic transformation algorithm used to render the payer digital signature. Examples of such algorithms are Digital Signature Algorithm (DSA); Rivest, Shamir, Adelman (RSA); and Elliptical Curve Digital Signature Algorithm (ECDSA). A PSD certificate serial number 34, provided in barcode form only, identifies the serial number for the certificate used to authenticate the public/private key combination issued to the Payer PSD 12 by a Certificate Authority. The PSD certificate serial number 34 enables the postal authority 10 to select a public key from a public key database maintained by the postal authority 10. The public key corresponds to a private key used by the Payer PSD 12 to create a digital signature for the value message 14. Thus, the Payer PSD 12 need not include the public key with the value message 14.

The next set of data elements facilitate tracking value messages and accounting. A device ID 36, provided in both text and barcode form, represents the unique identifier of the Payer PSD 12 (i.e., each instance of a payer PSD receives its own unique identification). The device ID 36 in an embodiment of the present invention, is the payer identification. Embedded within the device ID 36 is a provider ID that specifies the maker of the Payer PSD 12, a model identification, and a device serial number (for the particular provider and model). In other embodiments, additional fields are provided which enable a specific user of the Payer PSD 12 to be identified as the payer. For example fields identifying the payer's name and identification number. In such instances, additional safeguards may be added, such as personal identification numbers (PINs) to ensure that the value of a processed endorsed value message is subtracted from one of potentially several accounts that may use the Payer PSD 12.

An ascending register value 38, provided in barcode form only, specifies a running accumulated total of the value dispensed by the Payer PSD 12. The ascending register starts at zero and is incremented by the value assigned to the value message each time the Payer PSD 12 issues a new value message. A descending register value 40, provided in barcode form only, specifies the amount of money/credit left in the Payer PSD 12 after decrementing the descending register by the value specified by the value message 14. The descending register 40 acts as a safeguard against another unauthorized user obtaining access to the Payer PSD 12 and cleaning out the entire account of the rightful owner of the PSD 12. The descending register 40 can be loaded with the full amount of value/credit remaining in the corresponding account, but the descending register 40 may also be loaded with a smaller amount specified by the PSD 12 during a funding operation. During a funding operation a user requests additional value to be added to the Payer PSD 12, and in response the descending register value 40 is increased by the requested amount. When the Payer PSD 12 is used as a credit/debit device, the descending register need not be used, or used alternatively to impose a credit limit upon the Payer PSD 12.

A payment value 42, provided in both text and barcode form, specifies the amount that the value message 14 is worth when presented to the postal authority 10. When the value message is processed by the postal authority 10, the payee's account is credited by the amount specified by the payment value 42, and the payer's account is debited by an equal amount.

The value message 14 includes a date/time 44 corresponding to when the value message was issued by the Payer PSD 12. The date/time 44, provided in both text and barcode form, may be used by the postal authority 10 to generate detailed transaction reports for the Payer PSD 12. The date/time 44 may also be used to impose limitations on the presentation of "stale" value messages. Since the value message negotiation process is completely automated, flexible rules may be applied to the presentation of "stale" value messages. For example, a particular company may be offering rebates from the Payer PSD 12 with a requirement that all rebates must be received within 30 days of issuance. The postal authority 10, upon receipt of a value message, identifies the time limit from its database (or from a field on the value message) and accepts the value message if it has been presented within the required 30 days.

The value message, as mentioned above, includes a payee identification 46. The payee identification 46, provided in both text and barcode form, specifies an account to which the postal authority 10 applies a deposit/credit in the amount specified in the payment value 42 when the value message is processed. The payee identification uniquely identifies a payee account. Since personal names, such as "John Smith" may be duplicated, the payee identification includes a unique alphanumeric account identification.

Next, a transaction number 48 uniquely identifies the issued value message 14 by the Payer PSD 12. The transaction number 48 is printed in text and barcode graphics upon the value message 14 and stored within the Payer PSD 12 for later auditing. This number is used as well to identify presentment of the endorsed value message 17 corresponding to the value message 14. The transaction number 48 is not to be confused with a separate field, described herein below, which provides a unique transaction identification supplied by the postal authority 10 to the payee in response to successful processing of the endorsed value message 17.

The data segment that will be discussed is a payer digital signature 50. In an embodiment of the invention, the payer digital signature 50, provided in barcode form only, is a hashed, cryptographically transformed representation of all the data fields set forth above. As a result, if a recipient of the value message were to change any data element, the digital signature would no longer correspond to the data fields. In that case, when the value message is presented to the postal authority 10 and the value message is processed, the authentication of the value message would fail and the presented endorsed value message 17 would be rejected. The payee digital signature 50 thus not only provides highly reliable tracing of the source of the digital signature 50 to the Payer PSD 14, the digital signature 48 presents a virtually insurmountable barrier to persons who may attempt to modify either the amount or payee specified in the value message 14.

The endorsed value message 17 includes a set of additional fields for authentication and record keeping. An algorithm ID 52, provided in barcode form only, identifies the type of cryptographic transformation used to render a payee digital signature 54 appended by the Payee PSD 16 when the endorsed value message 17 is issued by the Payee PSD 16. The payee digital signature 54 is cryptographically transformed by means of a public key stored at the postal authority 10 and accessed based upon the payee identification 46. Finally, the endorsed value message 17 includes a date/time 56 which specifies when the Payee PSD 16 issued the endorsed value message 17.

Additional fields may also be added to an endorsed value message. In particular, a transaction identification 58 uniquely identifies the endorsed value message 17 processed by the postal authority 10. The transaction identification 58, discussed further herein below, enables a vendor to identify a subsequent mailed parcel or mail piece corresponding to the endorsed value message 17. A message/memo field 60 is a catch-all field that may be used for a number of functions depending on particular applications. One such application, described herein below, is the use of the memo field to specify an email recipient and message for purposes of notifying an addressee of a package that the postal authority 10 has received a package to be delivered to the addressee.

While not explicitly depicted in the drawings, the value messages include error detection/correction codes to enable the postal authority 10 to detect/correct certain errors in the fields of the value message. The error detection/correction codes, in addition to possible redundant copies of the barcode graphics, enhance the robustness of the physical copies of the value messages. The above description of data element fields in a value message is exemplary. There is no intention to limit the present invention to the above described combination of fields as those skilled in the art will appreciate that additional fields may be added and others removed without deviating from the invention defined herein below.

Figure 3:
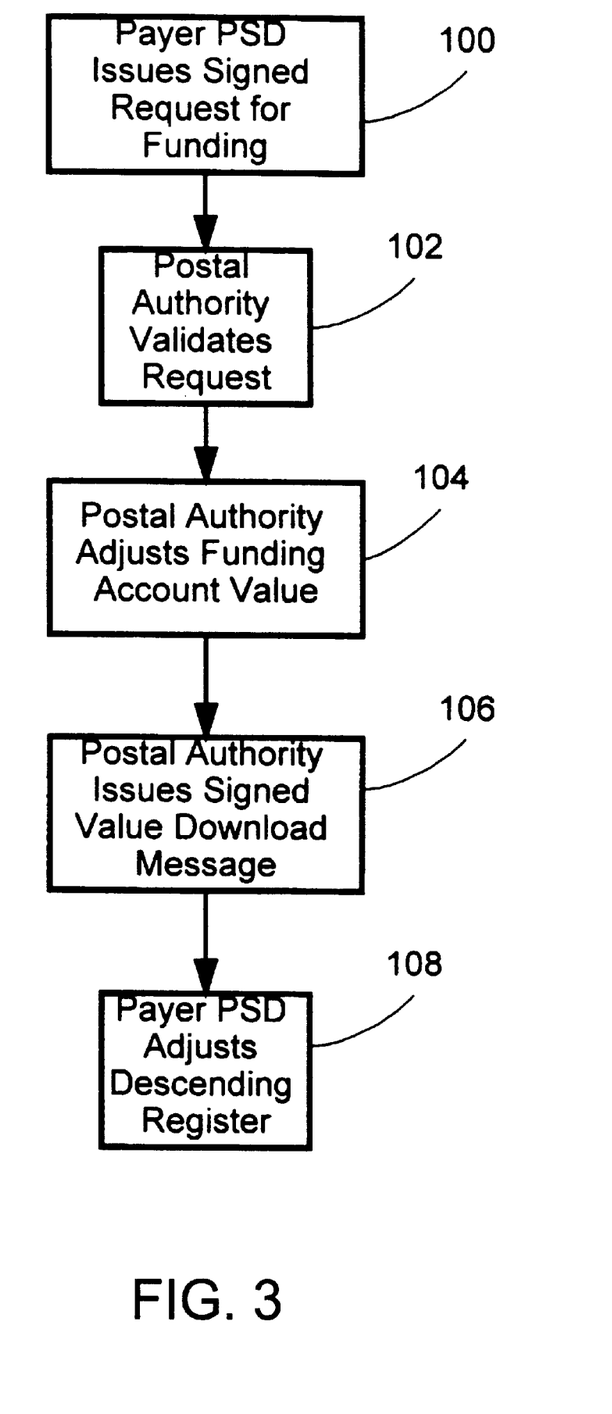
FIG. 3 is a flow chart summarizing the steps for funding a payer PSD.

The steps for carrying out a Payer PSD funding operation are summarized in FIG. 3. At step 100, the Payer PSD 12 issues a request to the postal authority 10 for a specified value to be funded to the Payer PSD 12 by the postal authority 10. The request includes a PSD identification and a private key cryptographically created digital signature. At step 102, the postal authority 10 authenticates the funding request from the Payer PSD 12 by cryptographically transforming the digital signature using a public key corresponding to the Payer PSD 12. The postal authority 10 also determines whether the amount requested by the Payer PSD 12 can be provided without exceeding the account limit for the Payer PSD 12.

Next, control passes to stage 104 and the postal authority 10 adjusts a "funding" account value for the Payer PSD 12. The funding account value differs from an actual account value since it is based upon the value funded to the Payer PSD 12. The actual account value is based upon the negotiation of presented endorsed value messages received by the postal authority 10.

Next, at step 106 the postal authority 10 issues a value download message to the Payer PSD 12. The value download message is authenticated with a private key cryptographically rendered digital signature. At step 108, the Payer PSD 12 cryptographically transforms the digital signature using a public key provided to the Payer PSD 12. The authenticated value download message is then used to increase the descending register value in the Payer PSD 12 by an amount equal to the funded amount.

Figure 4:
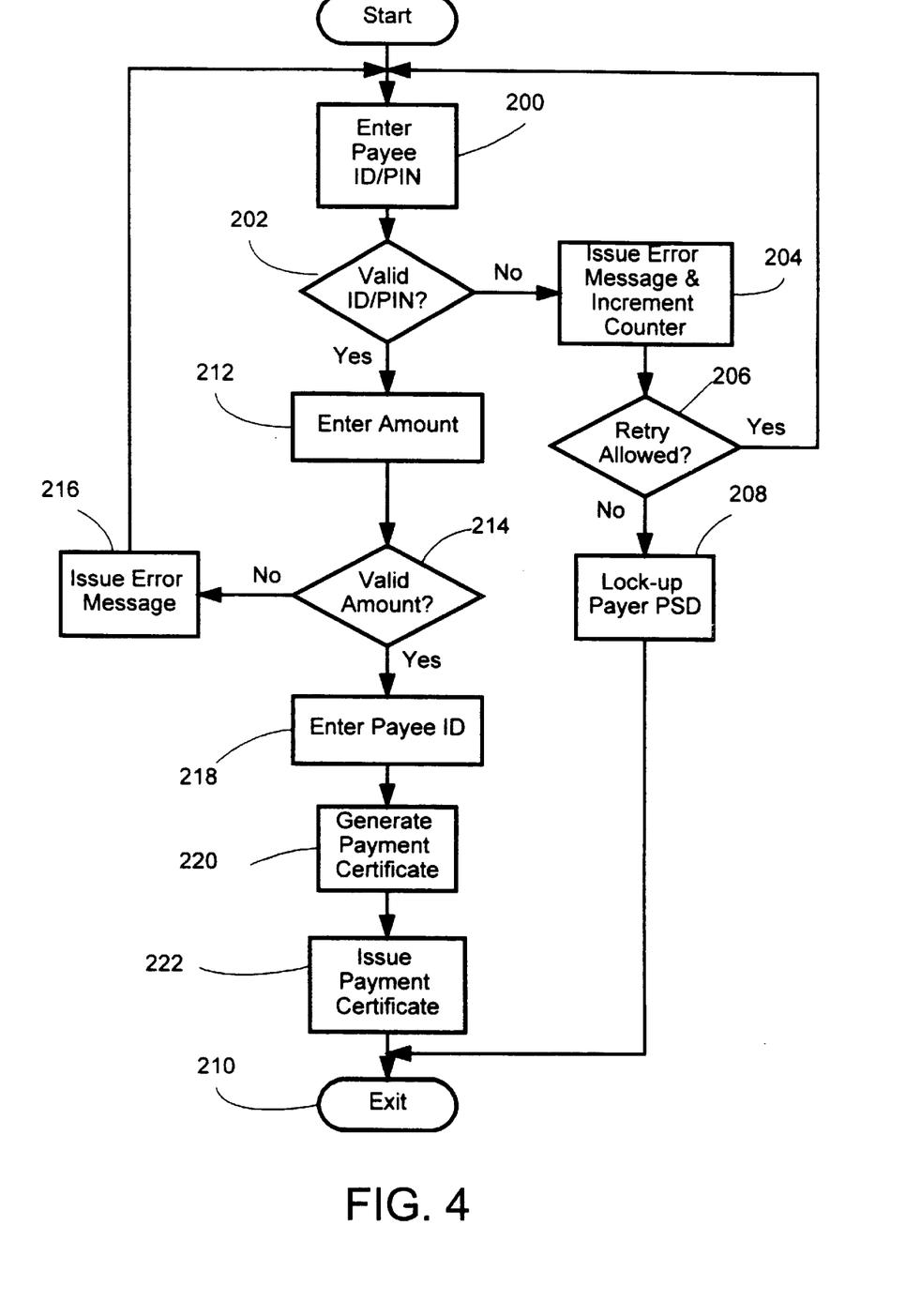
FIG. 4 is a flow chart summarizing the steps for a payer PSD issuing a value message.

The steps for vending, endorsing and negotiating the value message defined in FIG. 2 are summarized in FIG. 4. At step 200 the vending stage begins with a user entering a payer identification and/or PIN on the Payer PSD 12. The PIN is a private access number that must be entered for the identified payer identification in order to gain access to the value message issuing functionality of the Payer PSD 12. In response, the Payer PSD 12, at step 202, compares the entered payer identification and PIN to a corresponding data entry in the Payer PSD 12. If the values do not match, then control passes to step 204 where the Payer PSD 12 issues an error indication, increments an error counter (if an incorrect PIN was entered for a valid payer identification, and the Payer PSD 12 compares the number of consecutive PIN entry errors to a prescribed limit. Control then passes to step 206 wherein if the number of errors noted in the error counter has not exceeded the limit, then control returns to step 200, and the user is prompted to re-enter an identification and PIN. However, if the number of allowed retries has been exceeded, then control passes to step 208 and the Payer PSD 12 locks out the ability of any user to request issuance of a value message. This security mechanism prevents unauthorized users from appropriating the Payer PSD 12 and issuing value messages without the consent of the owner of the Payer PSD 12. After locking up the Payer PSD 12 to further user input, control passes to Exit step 210.

If at step 202, the user has entered a valid PIN for the entered payer identification, then control passes to step 212 wherein an amount is entered for the value message 14. Control then passes to step 214 wherein the Payer PSD 12 determines whether a valid amount was entered. If an invalid amount was entered (i.e., the entered amount exceeds a prescribed limit), then control passes to step 216 wherein an error message is generated indicating that the user has entered an invalid amount. Control returns to step 200 wherein the user must reenter an identification and PIN in order to retry entering a valid amount.

If at step 214 the amount specified by the user is valid, then control passes to step 218 wherein the Payer PSD 12 accepts an identification for the intended payee for the value message. Having received all the necessary information, the Payer PSD 12 at step 220 applies the amount to the current values of the ascending and descending registers, generates a transaction number, logs the transaction, and generates a payer digital signature. Control then passes to step 222 and the Payer PSD 12 causes the value message 14 to be issued. Control then passes to Exit step 210, a wait state wherein the PSD 12 awaits a next transaction (e.g., funding, vending, auditing, etc.).

Figure 5:
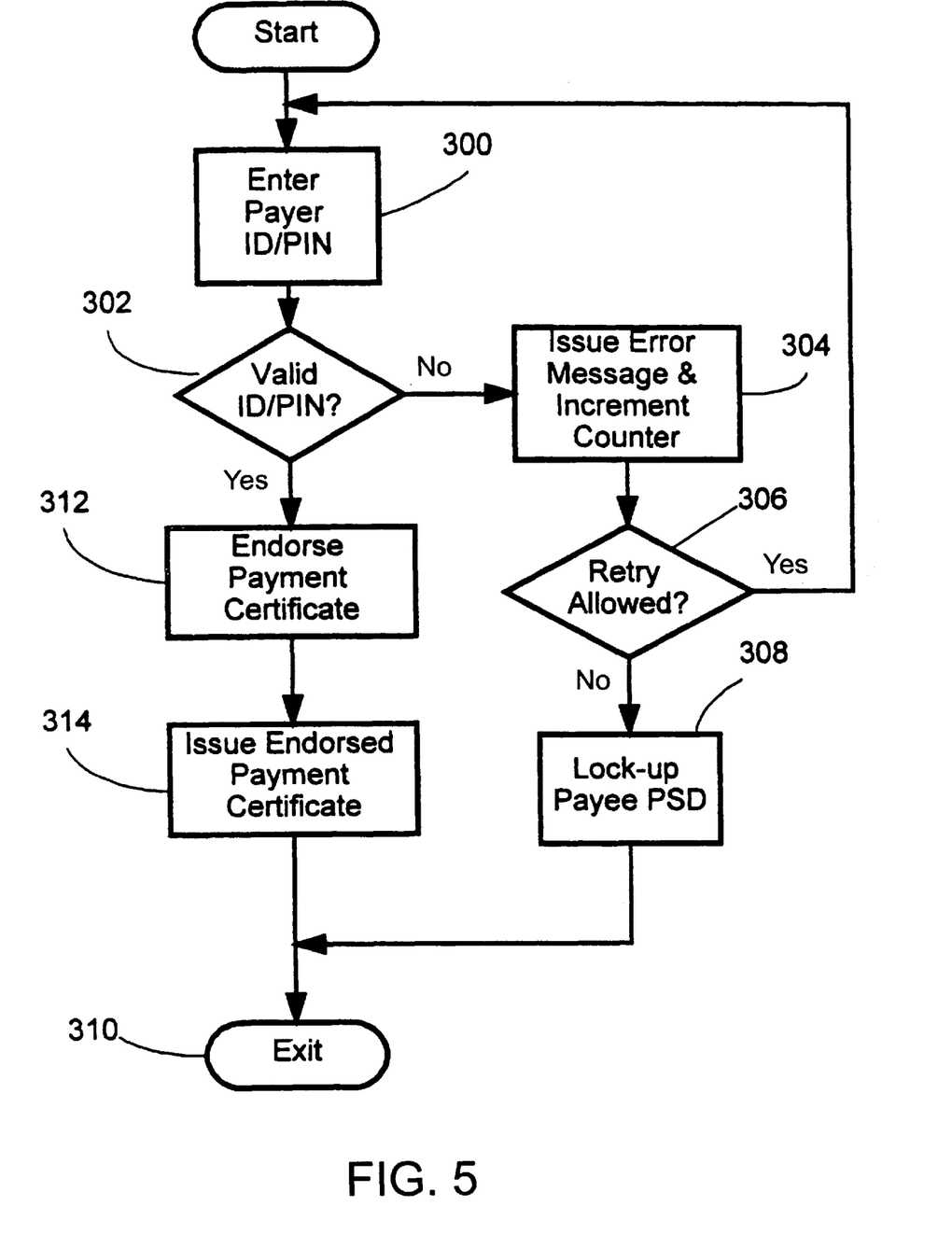
FIG. 5 is a flow chart summarizing the steps for a payee PSD endorsing a value message.

Turning to FIG. 5, the steps are summarized for rendering, by a Payee PSD 16, the endorsed value message 17. At step 300 the endorsement stage begins with a user entering a payee identification and/or PIN on the Payee PSD 16. The PIN is a private access number that must be entered for the identified payer identification in order to gain access to the value message issuing functionality of the Payee PSD 16. In response, the Payee PSD 16, at step 302, compares the entered payee identification and PIN to a corresponding data entry in the Payee PSD 16. If the values do not match, then control passes to step 304. At step 304 the Payee PSD 16 issues an error indication, increments an error counter (if an incorrect PIN was entered for a valid payer identification, and the Payee PSD 16 compares the number of consecutive PIN entry errors to a prescribed limit. Control then passes to step 306 wherein if the number of errors noted in the error counter has not exceeded the limit, then control returns to step 300, and the user is prompted to re-enter an identification and PIN. However, if the number of allowed retries has been exceeded, then control passes to step 308 and the Payee PSD 16 locks out the ability of any user to request endorsement of the value message 14. This security mechanism prevents unauthorized users from appropriating the Payee PSD 16 (or unendorsed value messages to the identified payee) and endorsing and presenting value messages without the consent of the payee. After locking up the payee's account to further attempts to endorse a value message payable to the payee, control passes to Exit step 310.

If at step 302, the user has entered a valid PIN for the entered payee identification, then control passes to step 312 wherein the Payee PSD 16 endorses the value message 14 by appending the payee digital signature to render the endorsed value message 17. Next, at step 314 the Payee PSD 16 issues the endorsed value message 17. As previously mentioned, the endorsed value message 17 is typically issued in paper form. However, it may also be issued in electronic form directly to the postal authority 10 without printing out the endorsed value message 17.

Figure 6:
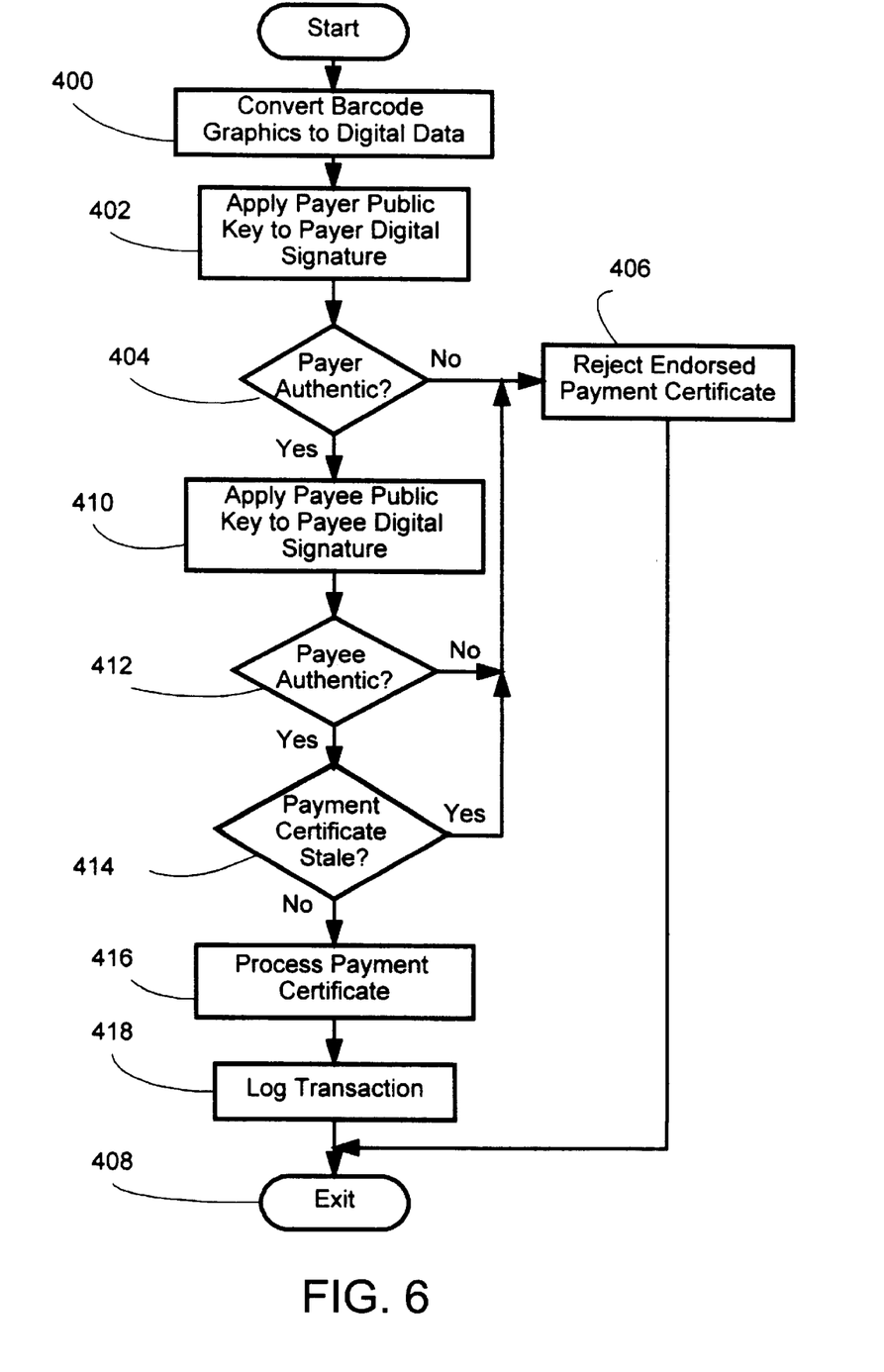
FIG. 6 is a flow chart summarizing the steps for the postal authority authenticating and processing an endorsed value message.

Turning now to FIG. 6, the steps are summarized corresponding to the stage of the value message life cycle wherein the endorsed value message 17 is negotiated. At step 400 the postal authority 10 scans the submitted endorsed value message 17 and converts the scanned barcode graphics to electronic digital data. Next at step 402 the postal authority 10 applies the payer public key to the payer digital signature. If, at step 404, the cryptographically transformed payer digital signature is not equal to a reference data string obtained by applying a hash function to data elements of the value message 14, then control passes to step 406. At step 406 the postal authority 10 rejects the endorsed value message 17 and logs the rejection transaction for purposes of later investigation of why the endorsed value message 17 was rejected. Control then passes to Exit step 408.

If, at step 404, the cryptographically transformed payer digital signature is equal to the reference data string, then control passes to step 410. At step 410 the postal authority 10 applies the payee public key to the payee digital signature. If, at step 412, the cryptographically transformed payee digital signature is not equal to a reference data string obtained by applying a hash function to data elements of the endorsed value message 17, then control passes to step 406. However, if the cryptographically transformed payee digital signature is equal to the reference data string generated from the endorsed value message 17, then control passes to step 414. At step 414 the postal authority 10 compares the issue date field of the endorsed value message 17 to the present date to determine whether the endorsed value message 17 is stale. If the endorsed value message 17 is stale, then control passes to step 406. If the endorsed value message 17 has been presented within the prescribed time period, then control passes to step 416 and the endorsed value message 17 is processed, and the accounts of the payee and payer are debited and credited respectively. At step 418 the transaction is logged for purposes of generating a monthly statement or auditing.

Figure 7:
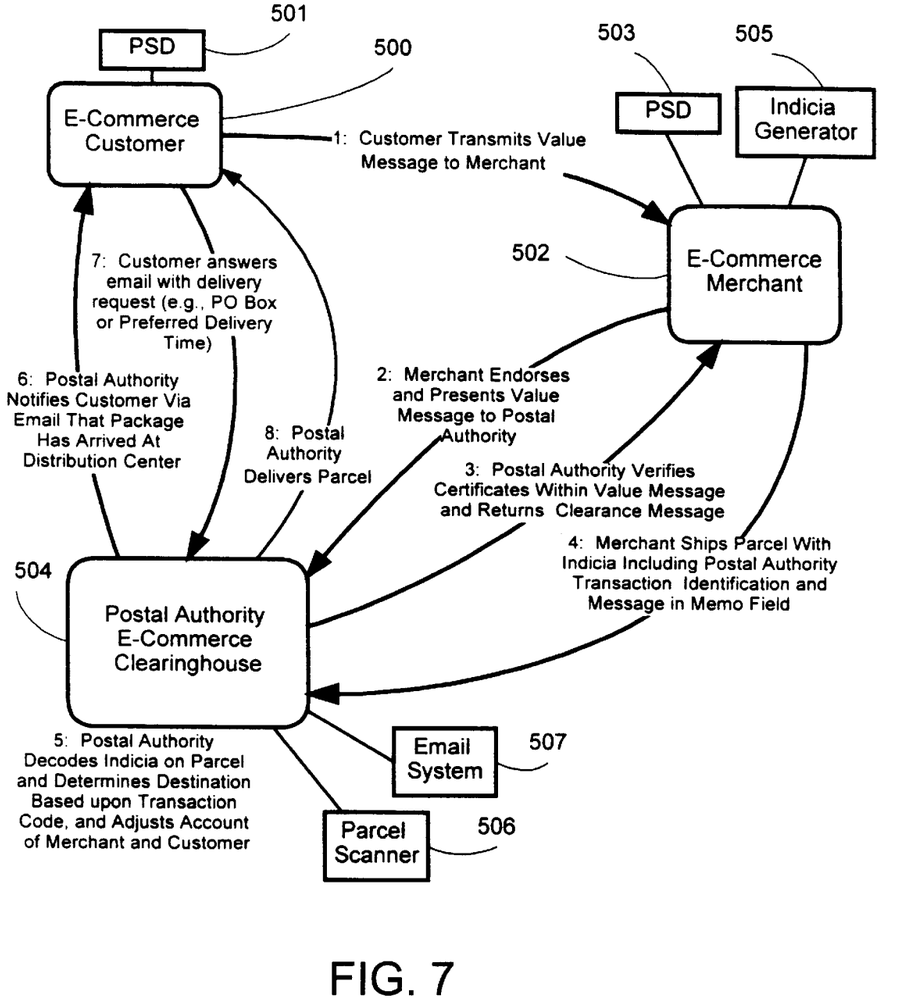
FIG. 7 is a diagram schematically depicting the components and steps performed by the system embodying the present invention in order to conduct an anonymous/pseudonymous electronic commerce transaction.

Turning now to FIG. 7, in another embodiment of the present invention, indicia and cryptographic transformations are incorporated into an electronic commerce transaction between a merchant and an anonymous customer. FIG. 7 illustratively depicts the stages of such a transaction. During stage 1 of the electronic commerce transaction, an e-commerce customer 500, using a postal security device (PSD) 501, generates a value message and transmits it to an e-commerce merchant 502 identifying a product that the customer 500 wishes to purchase. The product that the customer wishes to purchase is identified in the message/memo field 60 of the value message (see FIG. 2). The value message includes an identification of the PSD 501 issued to the customer 500. However, consistent with the intent to guard the privacy of the customer 500, the value message does not provide the identity of the customer 500 (e.g., no delivery address or email address). The value message, specifying an amount for the purchase identified in the message/memo field, is digitally signed by the payer PSD 12.

Next, at stage 2 of the e-commerce transaction, the e-commerce merchant 502, using a PSD 503, endorses the value message received from the customer 500. The endorsed value message includes the additional information and signature in fields 52, 54 and 56. In addition the merchant 502 may include a unique transaction value in the transaction identification 58 or a message to the postal authority 504—or an equivalent e-commerce clearinghouse. However, the unique transaction identification is preferably provided by the postal authority 504.

Next, at stage 3, the postal authority 504 performs cryptographic transformations upon the received endorsed value message to verify the authenticity of the signatures. As mentioned above, the present invention can be adapted to virtually any transaction model (e.g., value token, credit instructions, debit instructions, etc.). In the case where the endorsed value message is a debit instruction, the postal authority 504 verifies that the customer 500 has sufficient funds available to carry out the transaction. If the value token model is used, the message itself is value and the postal authority 504 need not verify the availability of funds or whether a credit limit has been reached. However, the postal authority 504 may apply customized fraud/spendthrift policies when processing the endorsed value message. Such policies may include transaction limits and time-based limits (e.g., $1,000/day). In order to perform this check, the postal authority correlates the PSD identification in the endorsed value message to a customer account within the postal authority's confidential database of customer PSD ID's. The postal authority returns a transaction identification to the merchant 502 which serves as the authorization for the merchant to mail the product purchased by the customer 500.

At stage 4 an indicia generator 505 generates a graphically encoded indicia. The content of the indicia corresponds to the graphically encoded indicia of the known Information Based Indicia Program (IBIP) Performance Criteria for Information-Based Indicia and Security Architecture for IBI Postage Metering Systems (PCIBISAIBIPMS) published by the postal authority Aug. 19, 1998, the contents of which are incorporated by reference in their entirety. The memo field of the indicium contains a number of sub-fields. The memo field includes the transaction identification previously transmitted by the postal authority 504 to the merchant during stage 3. The memo field also includes an indicium type identification indicating to the postal authority 504 that the indicium is for an anonymous e-commerce transaction. Finally, the memo/message field of the indicium may optionally include a message which is decoded by the postal authority and forwarded to the customer at the customer's email address. The indicium's inclusion of a type sub-field indicates to the postal authority that the parcel requires special processing because the parcel, due to the objective of maintaining the anonymity of the customer, does not include a destination address within the indicium.

During stage 5, after the postal authority 504 takes possession of the parcel containing the above described indicium, a parcel scanner 506 scans the indicia placed on the parcel by the indicia generator 505 and the scanned indicia is decoded at the postal authority 504. The postal authority 504 correlates the transaction identification 58 to a particular customer. In alternative embodiments of the invention other information, other pieces of information furnished by a customer which do not reveal the customer's surname or address to a merchant, such as a PSD identification, are used to determine a delivery destination for the parcel. If the postal authority 504 had not previously issued credit/charge deposit/debit statements to the financial institutions of the customer and vendor upon receipt of the endorsed value message, it issues such messages. By waiting until the postal authority 504 receives a parcel, the customer's account is not charged/debited until the purchased goods are apparently in the possession of the postal authority 504.

The stages described below relate to delivery of the parcel to the electronic commerce customer 500. During stage 6 an email system 507 within the postal authority 504 sends email to the customer 500 informing the customer that the postal authority 504 has received a parcel from the merchant 502. The email address may be included within the indicia, or if the customer wishes to maintain anonymous to the sender, then the email address is determined by the postal authority 504 from a database based upon a customer alias provided in the indicia. The email includes any of a number of pieces of information. For example, the email message preferably contains a field identifying a delivery schedule for the parcel. The postal authority 504 may inform the user of a likely time and date for delivery of the parcel. Alternatively, if delivery is to a post office box, the email message notifies the customer that mail is waiting at the customer's post office box. The email may also include a message from the merchant 502 that was extracted by the postal authority 504 from the memo/field within the indicium on the parcel.

At stage 7, the customer 500 submits a reply to the email sent by the postal authority 504. The reply, in addition to referring to the email message previously sent by the postal authority 504, confirms the scheduled delivery or alternatively specifies an alternative date/time. Other messages submitted by the customer may request that the postal authority 504 hold the parcel at a local post office to be picked up by the customer 500. The email operation is described in greater detail herein below with reference to FIG. 8.

Finally, at stage 8, the postal authority 504 delivers the parcel. The parcel is either delivered to the delivery point identified in a ZIP +6 (11 digit) code or delivered to the post office designated by the customer 504 during stage 7. Because the customer's address is located in the postal authority 504 database, the full 11-digit zip code can be automatically added to the parcel by the postal authority 504 when the indicium on the parcel (added by the merchant) is processed.

Having described particular example of an application of the value message and IBIP indicium specification for mail pieces which enable a customer to anonymously or pseudonymously conduct electronic commercial transaction with an e-commerce vendor, it will be appreciated by those skilled in the art that the above described stages may be modified while still allowing a user to submit a purchase request to a vendor in an e-commerce environment without revealing the customer's name, social security number, address, phone number, account codes, or other personal information that can be used for fraudulent or irritating actions at a later time by the e-commerce vendor or another company which purchases such information from the e-commerce vendor. Such other arrangements are intended to fall within the scope and spirit of the disclosed invention.

Figure 8:
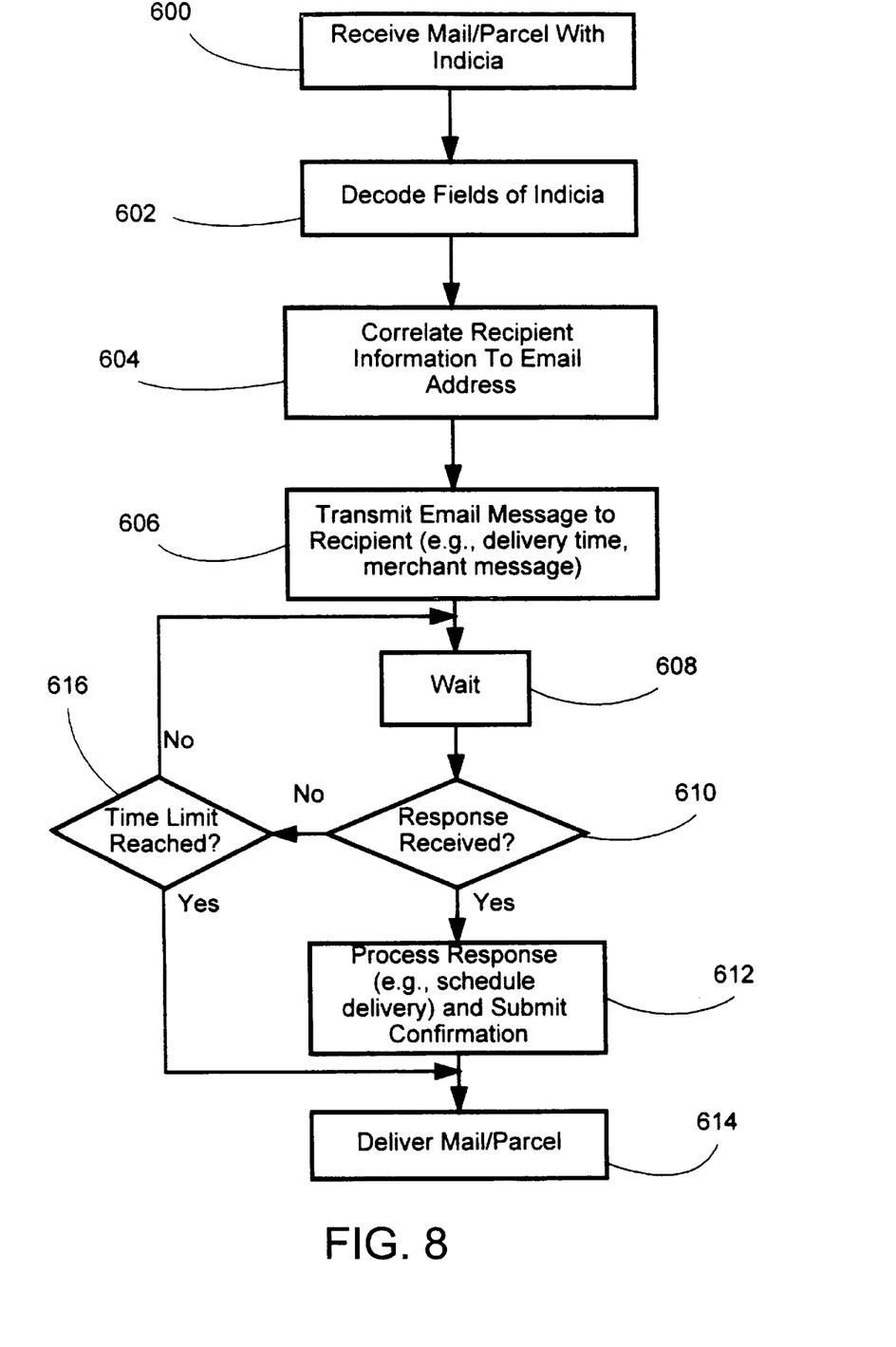
FIG. 8 is a flowchart summarizing the steps for performing email notification for parcel delivery in accordance with an embodiment of the present invention.

Turning now to FIG. 8, a sequence of steps are summarized for an email messaging scheme for use in conjunction with a mail operation. The parcel delivery email operation was initially discussed above with reference to an anonymous/pseudonymous e-commerce transaction. However, the email operation can be used in regular parcel delivery as well as an aid to tracking and delivering parcels. In such instances, the postal authority scans indicia on a parcel indicating an intended recipient for a parcel, determines an email address, and transmits an email message to the intended recipient.

At step 600, the postal authority receives a parcel or piece of mail including graphically encoded indicia as specified in the postal authority indicia program incorporated herein above by reference. At step 602, the postal authority scans the indicia and decodes the graphically encoded information contained within the indicia. In addition to standard address, accounting and security information, the graphically encoded indicia may include a first optional field that is decoded by the postal authority to determine an intended recipient of an email message. It is noted however, that the postal authority may determine the recipient in many cases by merely referring to the portion of the decoded information relating to the addressee of the scanned parcel. A memo/message field within the indicia contains a message from the sender of the parcel/mail piece. It is noted however that even when the memo/message field does not contain a message, the postal authority will transmit its own message informing the email recipient that the postal authority has received a parcel to be delivered to the email recipient.

The indicia will not typically contain an actual email address. Instead, the postal authority maintains a relational database that correlates identified recipients to email addresses. Thus, to become a subscriber to email notification, a recipient's email address is provided along with all potential mailing addresses/aliases to the postal authority. At step 604, the postal authority retrieves an email address corresponding to the recipient name/alias scanned and decoded from the indicia applied to the received parcel. The name/alias may include, as discussed with reference to FIG. 7, a pseudonym for the recipient in order to protect the recipient's privacy from a vendor. In fact, as disclosed above, the postal authority may perform a number of levels of tracing before reaching an actual email address depending upon the manner in which the email information is stored and the information provided on the indicia.

At step 606 the postal authority transmits email to the recipient including a message concerning delivery instructions (e.g., time and/or date for delivery) and/or a message from the merchant which was extracted from indicia on the parcel. While the above sequence of steps would be tedious and time consuming if performed manually, in the preferred system these steps are performed automatically by an integrated system at the postal authority including a parcel indicia scanner and an automated email system including an email address database, automated email document editor, and email mailing/receiving system. In such an integrated system, the information needed for emailing the recipient is extracted from the decoded, scanned indicia. An email document is automatically generated by the postal authority email system without any human intervention. The completed email document is automatically sent. Furthermore, the email system can be expanded to provide for standardized forms and keyed to generate forms based upon such variables as: mail class, sender type, receiver type, etc. The automated email form generation system can be programmed to evaluate the variables and select a proper email form.

At step 608, the email system waits a period of time that can be interrupted by reception of a response from the recipient of the email. At step 610 the mail system determines whether a response has been received from the recipient of the previously sent email. If an email response was received, then control passes to step 612 and the postal authority email system 507 processes the response and schedules a time and point for delivery of the parcel. The time may be merely "as soon as possible" or a more specific period such as a particular hour of a specified date. The postal authority email system 507 confirms the returned email message by submitting yet another email message to the parcel recipient. At step 614, the parcel is delivered.

If a response has not been received from the parcel recipient at the completion of a wait period during step 608, then control passes from step 610 to step 616. At step 616, if the parcel recipient has failed to respond within a designated wait period, then control passes to step 614 and the parcel is delivered without waiting for a response from the parcel recipient. If, however, the designated maximum wait period has not yet been reached, then control returns to step 608 and the postal authority email system continues to wait for a response from the parcel recipient.

Figure 9:
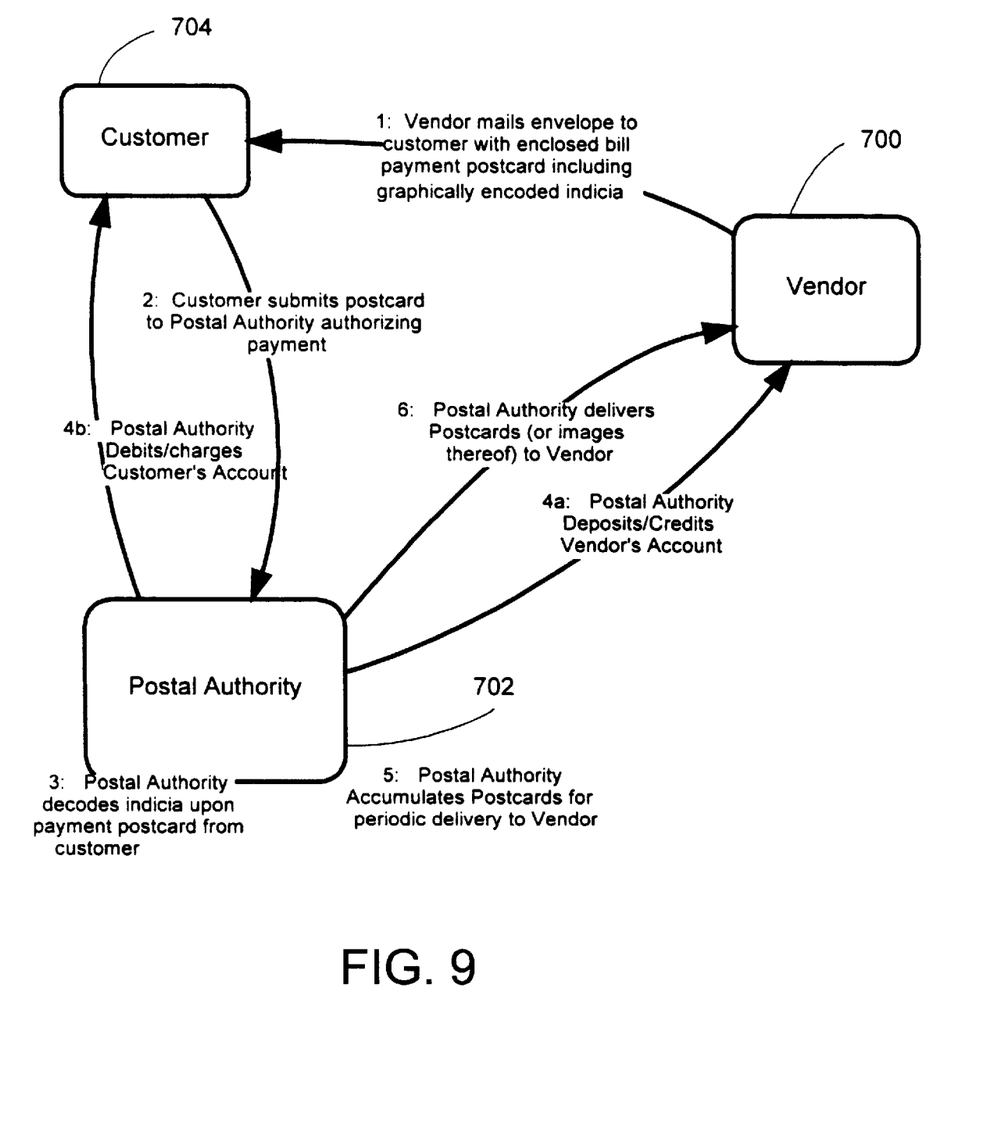
FIG. 9 is a diagram schematically depicting the components and steps performed by the system embodying the present invention in order to perform automated bill payment through submission of value messages on a postcard.

Turning to FIG. 9, the stages are summarized for a method for mail customers to perform bill payment via submission of a postcard, by a customer, into the postal authority mail stream. Bill payment is reduced to a customer opening an envelope from a payee, removing an enclosed postcard containing bill payment indicia (or generating such a postcard), and mailing the postcard. The postal authority, or some other designated recipient, scans the postcard, and the transaction of payment is registered in the respective accounts for the payee and the customer.

As illustratively depicted in FIG. 9, during stage 1 a vendor 700 generates a postcard containing indicia scannable by the postal authority 702 and mails the postcard in an envelope addressed to the customer 704. The postcard contains the same type of information as that disclosed in the value message depicted in FIG. 2. However, as those skilled in the art will readily appreciate, many of the fields are optional. Furthermore, a number of the fields will be modified in content due to the fact that the vendor 700 will generate the postcard and pay the postage for processing the postcard.

Referring to FIG. 2, fields 30, 32, 34, 36, 38 and 40 will refer to the vendor and the vendor's PSD rather than the sender of the postcard (the customer 704). Since the vendor 700 is paying the postage, the account registers 38 and 40 will correspond to the vendor's PSD. The payment value 42 will designate the amount to be paid by the customer 704 to the vendor 700.

As will be demonstrated below, it is not necessary for the customer 704 to have a PSD or other means for generating indicia to carry out the preferred version of bill payment. Therefore, in the preferred embodiment of the invention, the payer digital signature 50 is not utilized. However, in alternative embodiments requiring automated authentication of a payer's authorization to pay a bill, the payer digital signature 50 will be generated and added by the customer prior to placing the postcard in the mail stream. The vendor 700 generates and inserts a digital signature into the payee digital signature 54. The customer 704, in addition to being identified on the postcard in text form, is identified in the message/memo field 60. Finally, because it is envisioned that the indicia scanning capabilities of the postal authority will be utilized in a diverse number of new applications including both commercial transactions and enhanced service mail delivery, a sub-field within the message/memo field 60 (or some new field) will identify the particular indicia placed upon the postcard as bill payment indicia.

At stage 2, the customer 704, having opened the envelope from the vendor 700 and removed the postcard containing a payment authorization, submits the postcard to the postal authority 702. Prior to mailing the postcard the customer 704 may sign the postcard thereby authorizing payment of the bill. The signature may be either written or digital. However, the likelihood of fraud is low and therefore signatures of customers are not deemed essential. However, the digital signature of either the customer 704 or the vendor 700 greatly reduces the opportunity for fraud.

At stage 3, the postal authority 702 decodes the indicia on the postcard during the course of processing mail. The postal authority 702 first determines that the postcard represents a payment postcard. The postal authority 702 verifies the postcard's authenticity by performing a cryptographic transformation on the digital signature provided by the vendor 700. The postal authority 702 determines the parties to the bill payment transaction. A stages 4a and 4b the postal authority 702 issues credit/deposit and charge/debit instructions to the financial institutions (identified in the postal authority's database of enrolled users of postcard bill payment) of vendor 700 and the customer 704 respectively. Alternatively, the parties to the transaction maintain accounts with the postal authority and bill payments are applied to those accounts.

Rather than return the postcards immediately to the vendor 700, the postal authority 702 during stage 5 stores the postcard in a central location. During stage 6 the postcard, as well as all postcards for the vendor 700 are returned to the vendor 700. Alternatively, the postcards are discarded or recycled and the postal authority 700 provides images of the postcards via email or by some other compact media such as microfilm or reduced copies copied in sets on single sheets of paper.

It is noted that the basic bill payment system can be enhanced by adding additional security measures as well as email messaging to provide enhanced protection to the customer from fraudulent and erroneous transactions. The use of email notification provides the added benefit to customers informing them if and when their bill payment postcard was processed.

A number of systems and methods have been described for conducting business transactions by issuing postage value on a value message. The present invention is not limited to the disclosed embodiments of the invention. Rather, the invention is intended to cover the disclosed embodiments as well as other embodiments falling within the scope and spirit of the claimed invention as set forth below in the appended claims, to the greatest extent permitted by the patent laws.

What is claimed is:

1. A method for negotiating value using cryptographically transformed electronically interpretable indicia media comprising the steps of:

issuing a value message including a payer identification, a payee identification, an amount to be negotiated by presentment to a postal authority outlet, and a payer digital signature;

providing a public key for cryptographically creating the payer digital signature in order to authenticate the value message;

presenting, by a payee, the value message to a postal authority outlet;

authenticating, by a postal authority validation apparatus, the value message by applying the public key to the digital signature; and adjusting at least one account status to reflect successful completion of negotiating the value message.

2. A system for conveying value using cryptographically transformed electronically interpretable indicia media, the system comprising:

an electronic apparatus for generating a value message including a payer identification, a payee identification, an amount to be negotiated by presentment of the value message to a postal authority outlet, and a payer digital signature;

a public key for authenticating the value message by application of the public key to the payer digital signature;

a value message reader for sensing indicia within the value message and transmitting information within the value message in binary form;

a value message resolver including:

an electronic interface coupled to the value message reader for receiving the information within the value message;

an authenticator for applying the public key, in accordance with a cryptographic transformation algorithm, to the payer digital signature to verify the authenticity of the value message; and an account manager for adjusting at least one account status in response to successful cryptographic transformation and authentication of the value message by the authenticator.

3. The system of claim 2 further comprising a payee endorser.

4. The system of claim 2 further comprising a transaction acknowledger that, in response to successful cryptographic transformation and authentication of the value message, issues a message to the payee confirming that the value message has been processed.

5. A method for executing at least part of an electronic commerce transaction in a manner such that the privacy of a customer is maintained with regard to a vendor, the method comprising the steps of:

submitting, from the customer to the vendor via an electronic transmission media, a purchase request including a unique customer identification and customer authentication code, the unique customer identification being of a type such that the customer's address and name identity are not discernable by the vendor from the unique customer identification; and depositing into a delivery stream, by the vendor, a parcel containing an item corresponding to the purchase request, the parcel including a graphically encoded mailing label and the label including information sufficient to enable a parcel delivery service to determine a delivery point for the parcel.

6. The method of claim 5 further comprising the steps of:

receiving, by the parcel delivery service, the parcel; and correlating, by the parcel delivery service, the information provided on the graphically encoded mailing label to a delivery point.

7. The method of claim 5 further comprising the step of:

correlating, by the parcel delivery service, the information provided on the graphically encoded mailing label to an email address; and submitting, by the parcel delivery service, an email message concerning the parcel.

8. The method of claim 7 wherein the email message includes information provided by the vendor on the graphically encoded mailing label.

9. The method of claim 7 wherein the email message includes information provided by the parcel delivery service concerning delivery of the parcel.

10. The method of claim 5 further comprising the step of:

submitting an endorsed purchase request, issued by the vendor, to a purchase clearinghouse, the endorsed purchase request including the unique customer identification.

11. The method of claim 10 further comprising the steps of:

effecting electronic charge/payment operations between the customer and the vendor in response to the receiving step.

12. The method of claim 10 further comprising the steps of:

processing, by the purchase clearinghouse, the endorsed purchase request; and returning a transaction clearance message to the vendor.

13. The method of claim 12 wherein the transaction clearance message includes a unique transaction identification and the label includes the unique transaction identification.

14. A method for conducting parcel delivery utilizing the email accounts of parcel recipients, the method comprising the steps of:

receiving, by a parcel delivery service, a parcel including graphically encoded information;

decoding, by the parcel delivery service, the graphically encoded information;

identifying an email address corresponding to the parcel; and transmitting an email message to the identified email address.

15. The method of claim 14 wherein the email message contains a message from a vendor to an intended recipient of the parcel.

16. The method of claim 14 further comprising receiving a response to the transmitted email message.

17. The method of claim 16 further comprising the step of:

scheduling delivery of the parcel based upon the received response to the email message.

18. The method of claim 14 wherein the email message contains a message from the parcel delivery service to an intended recipient of the parcel concerns delivery of the parcel.

19. The method of claim 18 wherein the email message includes information pertaining to delivery scheduling.

20. A method for performing bill payment by a customer to a vendor via scanning of postcards, the method comprising the steps of:

providing by the vendor, a postcard containing graphically encoded bill payment instructions;

depositing the postcard within a mail stream accessible by a delivery service;

decoding, by the delivery service, the graphically encoded bill payment instructions on the deposited postcard; and issuing, by the delivery service, bill payment instructions to the respective financial institutions for the customer and the vendor.

* * * * *

UNITED STATES PATENT AND TRADEMARK OFFICE
CERTIFICATE OF CORRECTION

PATENT NO.      : 6,289,323 B1                                    Page 1 of 1
DATED           : September 11, 2001
INVENTOR(S)     : Roy R. Gordon It is certified that error appears in the above-identified patent and that said Letters Patent is hereby corrected as shown below:

<u>Title page,</u>
Item [75] Inventors; change "Wayne E. Wilkerson" to -- Wayne A. Wilkerson --

Signed and Sealed this

Fourteenth Day of May, 2002

*Attest:*

JAMES E. ROGAN
*Attesting Officer*   *Director of the United States Patent and Trademark Office*